Patented Feb. 2, 1943

2,310,128

UNITED STATES PATENT OFFICE 2,310,128

OXYCHLORIDE COATING

George Sidney Smith, Oakland, Calif.

No Drawing. Application October 10, 1939,
Serial No. 298,866

9 Claims. (Cl. 117—123)

The present invention relates to the production of protective metal oxychloride coatings, articles carrying said coating, and a composition of matter adapted to produce said coating.

It is well known that in the production of metal oxychloride compounds that when the ingredients functioning to produce the metal oxychloride are mixed in the presence of water, that the oxychloride is formed, the reaction taking place very rapidly with a minimum amount of water necessary for the reaction. If the reaction mixture is properly compounded a good cement is formed. However, if an excess of water is added to the mixture to form a consistency suitable for brushing or spraying then the density and coherence of the resulting coating is destroyed. This is particularly true in the production of zinc oxychloride compounds.

The principal object of the present invention is to form on an organic or inorganic base a hardened metal oxychloride coating by applying to the base an anhydrous mixture, including a volatile solvent therefor, said mixture having a consistency suitable for brushing or spraying, and being adapted to form the metal oxychloride on volatilization of the solvent and in the presence of an aqueous medium; and subjecting said anhydrous coating to the action of an aqueous medium in a quantity sufficient to form in situ by absorption a hardened oxychloride coating. In the preferred form of the invention the hardening is affected by exposure to the air for such a time to cause the volatile solvent to evaporate and the aqueous medium necessary for the reaction to be absorbed or adsorbed by the coating.

A further object of the invention is to provide concrete, cement, artificial stone, and materials of like nature, generating an alkaline component with an inorganic oxychloride coating, having an acid reaction, and which is of sufficient density to prevent the alkaline component of the base material, whatever it may be, from penetrating the paint, as for example, an organic paint, subsequently applied to the metal oxychloride coating.

Another object of the invention is to provide a substantially anhydrous composition having present ingredients potentially capable of producing a metal oxychloride, the oxychloride reaction being inhibited or retarded by the presence of an anhydrous or volatile solvent, which may also be termed a spirituous vehicle, said solvent or spirituous vehicle being adapted to take the metal chloride of the composition into solution.

It may be stated that when the anhydrous metal chloride, as for example, zinc chloride, is dissolved in an anhydrous volatile solvent therefor, as for example, alcohol, acetone, or the like, and the resulting solution mixed with a substantially anhydrous metal oxide, the proportions being such to form a mixture having a fluid consistency suitable for application in the manner of painting, as with brush or spray, there is practically no chemical reaction of an oxychloride character, during the time the mixture is kept free from exposure to the atmosphere and free from the water usually present in the atmosphere.

After the mixture is applied as a coating and exposed to atmospheric conditions, the solvent evaporates and the metal chloride being hygroscopic absorbs sufficient moisture from the atmosphere over a period of time to cause the required chemical reaction necessary to form the metal oxychloride compounds to occur and to thereby create an insoluble, dense, enamel-like coating, which in the preferred form of the invention, is highly water resistant and waterproof.

It may be stated that the oxychloride coating of the present invention may be applied to surfaces, such as wood, metal, stone, including concrete, cloth, porcelain, glass, plaster of Paris, and articles formed therefrom, as for example, concrete bricks, concrete floors and walls and concrete laundry tubs.

While the present invention will be specifically illustrated in connection with the production of a zinc oxychloride coating, the basic steps of the present invention are applicable to the production of any oxychloride coating, the metal chloride from which the oxychloride is formed being hygroscopic in character and soluble in an anhydrous volatilizable solvent.

More specifically, zinc chloride may be dissolved in anhydrous methyl alcohol, acetone, or the like, to form a solution of 50% or less of zinc chloride. There is then added, to the solution, zinc oxide until the material is at a consistency adapted for brush painting or spraying with a spray gun. Since the ingredients, namely, the solvent, the zinc chloride and the zinc oxide, are anhydrous, there is substantially no chemical reaction of an oxychloride character while the mixture is kept free from contact with any medium adapted to cause the oxychloride reaction to occur. If the anhydrous coating composition is exposed to the atmosphere, the volatile solvent begins to evaporate and the zinc chloride being hygroscopic absorbs sufficient moisture from the atmosphere, over a period of time, to cause the zinc chloride and zinc oxide to chemically react and form zinc oxychloride compounds. It is desired to point out that the anhydrous composition may contain ingredients which will in situ produce the zinc oxychloride coating. While, obviously, the most satisfactory method at the present time of forming the oxychloride coating is to mix the preformed zinc chloride and the preformed zinc oxide, compounds may be mixed which will in situ generate the zinc chloride and the zinc oxide. While it is stated that the anhydrous zinc chloride solution should preferably contain 50% or less of zinc chloride, obviously, such a solution merely gives the optimum operating conditions and, therefore, a solution which carries more than 50% of zinc chloride may be used.

In general, the coating composition may be applied to concrete, artificial stone, or other surfaces, and allowed to set until the evaporation of the volatile solvent is complete, said evaporation usually taking from about one to two hours, or even less. Obviously, the evaporating and setting time of the coating will vary in accordance with the character of the metal chloride constituent, the oxygen-containing constituent, the solvent, and, to some extent, the base material to which the coating is applied. Therefore, the above time is to be taken by way of illustration and not by way of limitation.

While, in some cases, a single coating will be sufficient, usually it is desirable, after the first coating has set, to apply a second coating and keep the same under undisturbed conditions for a sufficient length of time, as for example, twenty-four to seventy-two hours, or longer, until the volatile solvent has evaporated and the zinc chloride, which is hygroscopic, absorbs sufficient water from the atmosphere to cause the oxychloride reaction to occur and to bond the coating into a water-insoluble inorganic mass. Thereafter the coating may be washed with water or with a solution of zinc chloride. The set coating may also be washed with a coloring material. It is within the province of the present invention to include the coloring constituent in the original mixture, provided the coloring constituent does not deleteriously effect the anhydrous components of the mixture.

It is desired to point out that the coating composition of the present invention functions in a radically different manner from prior oxychloride coatings, in that as its volatiles are driven off, water is taken up from the atmosphere, or any equivalent medium, to effect the hardening of the coating. In contrast thereto, the prior coating compositions, having a water vehicle, when applied to a surface by painting, spraying, or the like, harden by allowing the water to evaporate to the atmosphere. The coating composition of the present invention, before application, is substantially anhydrous and contains no water. The water necessary to allow the chemical components of the composition to react to equilibrium, after being applied to the surface of the object being coated, is supplied by the atmosphere, the water being absorbed from the atmosphere in the correct amount for completion of the chemical reaction functioning to harden the coating mass.

The following are specific examples of suitable coating compositions:

Example 1

| | | |
|---|---|---|
| Anhydrous zinc chloride | grams | 40 |
| Anhydrous methanol | cubic centimeters | 50 |
| Anhydrous zinc oxide | grams | 120 |

The anhydrous zinc chloride is dissolved in the methanol and when the solution product has cooled, anhydrous zinc oxide is added. The mixture is about the consistency of a good painting material. The composition is brushed or sprayed onto any surface, one or two coats being applied, and the composition is kept undisturbed in the atmosphere until the components thereof have reacted and the mass thereof has become hard and substantially water-insoluble.

Example 2

| | | |
|---|---|---|
| Anhydrous zinc chloride | grams | 40 |
| Anhydrous methanol | cubic centimeters | 50 |

Dissolve and mix with:

| | | |
|---|---|---|
| Anhydrous zinc oxide (in fine powder) | grams | 100 |
| Silicon dioxide (in fine powder) | do | 20 |

The above ingredients are mixed and applied in the same manner as described in connection with Example 1. The silicon dioxide acts as a filler and also may provide a decorative effect.

Example 3

| | | |
|---|---|---|
| Anhydrous zinc chloride | grams | 40 |
| Anhydrous methanol | cubic centimeters | 40 |
| Anhydrous methyl ketone | do | 10 |
| Anhydrous nickel chloride | grams | 3 |

Dissolve and mix with:

| | | |
|---|---|---|
| Anhydrous zinc oxide (in fine powder) | grams | 120 |
| Anhydrous titanium oxide (in fine powder) | do | 5 |

The above anhydrous composition contains anhydrous nickel chloride, which appears to promote the formation of the zinc oxy-chloride. Any of the above coatings may be washed with water and/or a solution of zinc chloride or with copper sulfate or any equivalent material adapted to provide the coating with a color or decorative effect.

While the alcohols and acetones have been set forth as suitable solvents, any volatile solvent may be used, as for example any of the higher alcohols including propyl, iso-propyl, butyl and iso-butyl alcohols. Instead of using acetone which is representative of the ketones, other ketones may be used, as for example, propyl ketones, butyl ketones, or mixed ketones, as for example, methyl iso-butyl ketone. While the methanol, acetone and methyl iso-butyl ketone may be used separately, they can also be combined to produce a composite solvent suitable for dissolving the methyl chloride.

While methanol and acetone are the preferred solvents because of their cheapness, it is within the province of the present invention to utilize any of the prior art solvents of aromatic or aliphatic character, including the cyclic aliphatic and the cyclic aromatic compounds and their derivatives, which do not have any deleterious action upon the metal chloride and the metal containing oxygen constituents of the composition, said solvents having a relatively high rate of evaporation. Instead of using the propyl, butyl, ethyl, and methyl ketones, derivatives thereof may be used.

It is desired to point out that any of the above solvents may be mixed with each other or that the final solvent may be a mixture of three or more of the above solvents. In short, the solvent mixture may be selected from any of the prior art volatile solvent compounds, subject, however, to the provision that they have a fairly high rate of evaporation and do not deleteriously react upon the ingredients of the coating composition or upon the final oxychloride reaction product.

It is preferable that the zinc oxide should be in excess of the molecular proportions necessary for the reaction.

It is within the province of the present invention to incorporate in the anhydrous coating composition, anhydrous fillers and anhydrous organic and inorganic agents which will function to color the cementitious coating.

More specifically, the coating mixture may be mixed with the chlorides, oxides, hydroxides, sulfates, arsenites, aluminates, oxalates, fluorides, phosphates, sulphides, borates, having in combination any of the following: aluminum, boron, bismuth, cadmium, calcium, barium, zinc, antimony, arsenic, lead, copper, tin, iron, cobalt, silicon, nickel, chromium, magnesium, manganese, mercury, titanium, and zirconium. While certain of these compounds will act as fillers and/or coloring agents, it is obvious that the present invention is not limited to the incorporation in the coating mixture of these particular compounds. In other words, the above are set forth by way of illustration and not by way of limitation.

There may also be added to the coating composition any leveling agent which will dissolve in the solvent of the anhydrous mixture. Small proportions of carbon tetrachloride, chloroform, ether and the like function to impart to the mixture a leveling quality when the mixture is painted on to a surface. Small proportions of propyl, butyl, ethyl and methyl ketones and their compounds and derivatives when added to the solvent mixture function as leveling agents. Not only may leveling agents be added, but the mixture may have a plasticizer added thereto, as for example, tricresyl phosphate. Other organic plasticizers which may be added are dibutylthalate, castor oil, tung oil, and alkyd resin varnish.

It is obvious that instead of using the above plasticizers any plasticizer may be used which will dissolve in the anhydrous solvent of the mixture.

While it is preferable to dissolve the metal chloride in the volatile solvent used and then add the metal oxide and other solvents to bring the mixture up to proper consistency before application, it is within the province of the present invention to first mix all of the solvents together and thereafter add the solvent or solvents to the mixture before the latter is applied to the coating base.

While the composition herein set forth forms very satisfactory coatings, it is obvious that it is not limited in its application as a coating material. It may be used as a binder. In that case, the conversion of the binder to the oxychloride state may be promoted by humidifying an inert gas, such as air or nitrogen, or other inert gases, and passing the mixture in contact with the article in which the oxychloride cement acts as a binder, the humidified gas, which may or may not be heated, functioning to cause the volatile solvent to evaporate and simultaneously supply the aqueous component necessary for the oxychloride reaction.

It is desired to point out that the fillers may be either organic or inorganic in character. The organic fillers may be wood, cellulose compounds, or cellulose derivatives, paper, or organic waxes, all of the above components being present in the mixture in an anhydrous condition.

The composition of the present invention may be kept indefinitely in air-tight containers, such as cans, and the cement is not formed until water is added thereto, or until it is painted upon a surface and absorbs the moisture from the air or other medium. Therefore, the composition of the present invention may be packaged and sold as an article of commerce. The present invention in its broadest phase includes the composition of matter and the production of articles carrying said composition of matter, irrespective of the function of the oxychloride cement. The invention in its more limited aspect is directed to the production of protective metal oxychloride coatings, and articles carrying said coating.

Referring to Example 3 it is to be noted that there is present in the anhydrous mixture anhydrous nickel chloride which functions as a catalytic agent. It is within the province of the present invention to use other catalytic agents. The nickel chloride also tends to increase the glaze effect of the coating. After the oxychloride coating has set it may, as pointed out, be washed with a solution of zinc chloride, the latter functioning to provide the surface with a glaze effect.

When the present oxychloride coating is applied to a smooth surface very frequently it will not adhere well to said surface. Wood, glass, concrete, or metal, which has not been previously painted, may in some cases have a smooth surface. In accordance with the present invention prior to applying the oxychloride coating, the smooth surface may have applied thereto an inorganic or organic priming coat preferably containing a frit, which will bond to the smooth surface. When the priming coat dries there will be exposed a rough surface upon which the oxychloride coating may be applied.

The oxychloride coating of the present invention, and particularly zinc oxychloride coating, is unaffected by the sun or its rays, as there is nothing in the coating constituents which will burn, as is true of ordinary paints. When the oxychloride coating is applied over ordinary paint it protects the paint from the action of the sun's rays.

The oxychloride coating may be mixed with any extremely hard material having a high resistance to abrasion, as for example, carborundum or alundum grit, and used as a coating material for walls, porches, steps and the like.

The oxychloride composition of the present invention may be used as a putty, in accordance with the following: 10 cc. of the mixture set forth in Example 1 is mixed with 40 grams of zinc oxide until a thick putty-like paste is formed. The putty-like paste may be used to fill cracks or apertures in the surfaces of various articles. More specifically, concrete, cement, and articles made of wood and composition articles may be treated with the putty.

The composition of the present invention may be moulded into suitable shapes and may also be used as a plastic.

It is obvious that the composition has many uses besides those specifically set forth, it being pointed out that the said uses are set forth by way of illustration and not by way of limitation.

What is claimed is:

1. The method of forming a cementitious coating on a base member comprising applying to the surface thereof an anhydrous mixture of zinc chloride dissolved in a volatile anhydrous solvent for the zinc chloride and zinc oxide, the proportions of zinc chloride, zinc oxide and solvent being such that a flowable mixture capable of brushing or spraying is produced, said mixture on volatilization of the solvent and in the presence of an aqueous medium forming zinc oxychloride; and exposing said anhydrous coating to the action of an aqueous medium in a quantity sufficient to form in situ a hardened zinc oxychloride coating.

2. The method of forming a cementitious coating on a base member comprising applying to the surface thereof an anhydrous mixture including zinc oxide, zinc chloride, and a volatile solvent for the zinc chloride, the proportions of zinc oxide, zinc chloride and solvent being such that a flowable mixture capable of brushing or spraying is produced, said mixture on volatilization of its solvent and in the presence of an aqueous medium forming a zinc oxychloride; and exposing said anhydrous coating to the action of air containing an aqueous medium in a quantity sufficient to form in situ a hardened zinc oxychloride coating.

3. The method of forming a cementitious coating on a base member comprising applying to the surface thereof an anhydrous mixture including zinc oxide, zinc chloride and a volatile solvent containing acetone as its essential component, the proportions of zinc oxide, zinc chloride and solvent being such that a flowable mixture capable of brushing or spraying is produced, said mixture on volatilization of its solvent and in the presence of an aqueous medium forming a zinc oxychloride; and exposing said anhydrous coating to the action of air containing an aqueous medium in a quantity sufficient to form in situ a hardened zinc oxychloride coating.

4. The method of providing a member with an oxychloride constituent comprising mixing the anhydrous body ingredients of the member with an anhydrous mixture including zinc oxide, zinc chloride and a volatile solvent for the zinc chloride, said mixture on volatilization of the solvent and in the presence of an aqueous medium forming a zinc oxychloride, forming the article therefrom and exposing the article to the action of water to form a zinc oxychloride constituent.

5. The method of forming a cementitious coating on a base member comprising applying to the surface thereof an anhydrous mixture comprising zinc oxide and zinc chloride dissolved in a volatile solvent for the zinc chloride adapted to prevent said components from forming a hardened zinc oxychloride cement until said volatile solvent is volatilized and the mixture is exposed to an aqueous medium, the proportions of zinc oxide, zinc chloride and solvent being such that a flowable mixture capable of brushing or spraying is produced; and exposing said anhydrous coating to the action of an aqueous medium in a sufficient quantity to form in situ a hardened zinc oxychloride coating.

6. The method of forming a cementitious coating on a base member comprising applying to the surface thereof an anhydrous mixture comprising zinc oxide and zinc chloride dissolved in a volatile solvent containing methanol as its essential component, said mixture being adapted to prevent said components from forming a hardened zinc oxychloride cement until said volatile solvent is volatilized and the mixture is exposed to the atmosphere, the proportions of zinc oxide, zinc chloride and solvent being such that a flowable mixture capable of brushing or spraying is produced; and exposing said anhydrous coating to the action of the atmosphere whereby there is formed by an in situ reaction a hardened zinc oxychloride coating.

7. As a new composition of matter, an anhydrous mixture containing zinc oxide and zinc chloride substantially completely dissolved in a volatile solvent for the zinc chloride adapted to prevent said components from forming a hardened zinc oxychloride cement until the volatile solvent is volatilized and the mixture is exposed to the action of the atmosphere.

8. As a new composition of matter, an anhydrous mixture containing zinc oxide and zinc chloride substantially completely dissolved in a volatile solvent containing methanol as its essential component, said solvent being adapted to prevent said components from forming a hardened zinc oxychloride cement until the volatile solvent is volatilized and the mixture is exposed to the action of the atmosphere.

9. An anhydrous coating composition adapted to be applied to a base member, said coating composition containing zinc oxide and zinc chloride dissolved in a volatile solvent adapted to prevent said components from forming a hardened zinc oxychloride cement until the volatile solvent is volatilized and the mixture is exposed to contact with an aqueous medium, the latter functioning to promote the formation of a hardened zinc oxychloride coating, the proportions of zinc oxide, zinc chloride and solvent being such that a flowable mixture capable of brushing or spraying is produced.

GEORGE SIDNEY SMITH.